US009016164B2

(12) United States Patent
Tan

(10) Patent No.: US 9,016,164 B2
(45) Date of Patent: Apr. 28, 2015

(54) BICYCLE CONTROL DEVICE

(71) Applicant: Yong Liang Steve Tan, Jurong Town (SG)

(72) Inventor: Yong Liang Steve Tan, Jurong Town (SG)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 62 days.

(21) Appl. No.: 13/659,261

(22) Filed: Oct. 24, 2012

(65) Prior Publication Data

US 2014/0109718 A1    Apr. 24, 2014

(51) Int. Cl.
*F16C 1/10*    (2006.01)
*B62M 25/04*    (2006.01)
*B62K 23/06*    (2006.01)

(52) U.S. Cl.
CPC ........... *B62M 25/04* (2013.01); *Y10T 74/20612* (2015.01); *B62K 23/06* (2013.01)

(58) Field of Classification Search
USPC ........................... 74/489, 500.5, 501.6, 502.2
See application file for complete search history.

(56) References Cited

U.S. PATENT DOCUMENTS

| | | | | |
|---|---|---|---|---|
| 3,633,437 | A * | 1/1972 | Ishida | 74/489 |
| 5,325,735 | A * | 7/1994 | Nagano | 74/502.2 |
| 5,676,022 | A * | 10/1997 | Ose | 74/502.2 |
| 5,732,598 | A * | 3/1998 | Shoge et al. | 74/473.13 |
| 5,921,139 | A * | 7/1999 | Yamane | 74/473.13 |
| 6,244,207 | B1 * | 6/2001 | Chen | 116/28.1 |
| 7,000,496 | B2 * | 2/2006 | Wessel et al. | 74/502.2 |
| 7,152,497 | B2 | 12/2006 | Sato et al. | |
| 7,950,307 | B2 * | 5/2011 | Miki | 74/502.2 |
| 2007/0068314 | A1 | 3/2007 | Miki | |
| 2007/0245847 | A1 | 10/2007 | Chen | |

* cited by examiner

*Primary Examiner* — Vicky Johnson
(74) *Attorney, Agent, or Firm* — Global IP Counselors

(57) ABSTRACT

A bicycle control device is provided that basically includes a support structure, a control unit, a first operating lever, a first gear and a second gear. The control unit is mounted on the support structure. The first operating lever is operatively connected to the control unit to operate the control unit. The first gear is rotatably mounted on the support structure about a first axis. The second gear is engaged with the first gear, and is rotatably mounted on the support structure about a second axis. The second gear includes indicia indicative of a plurality of states of a bicycle component.

11 Claims, 9 Drawing Sheets

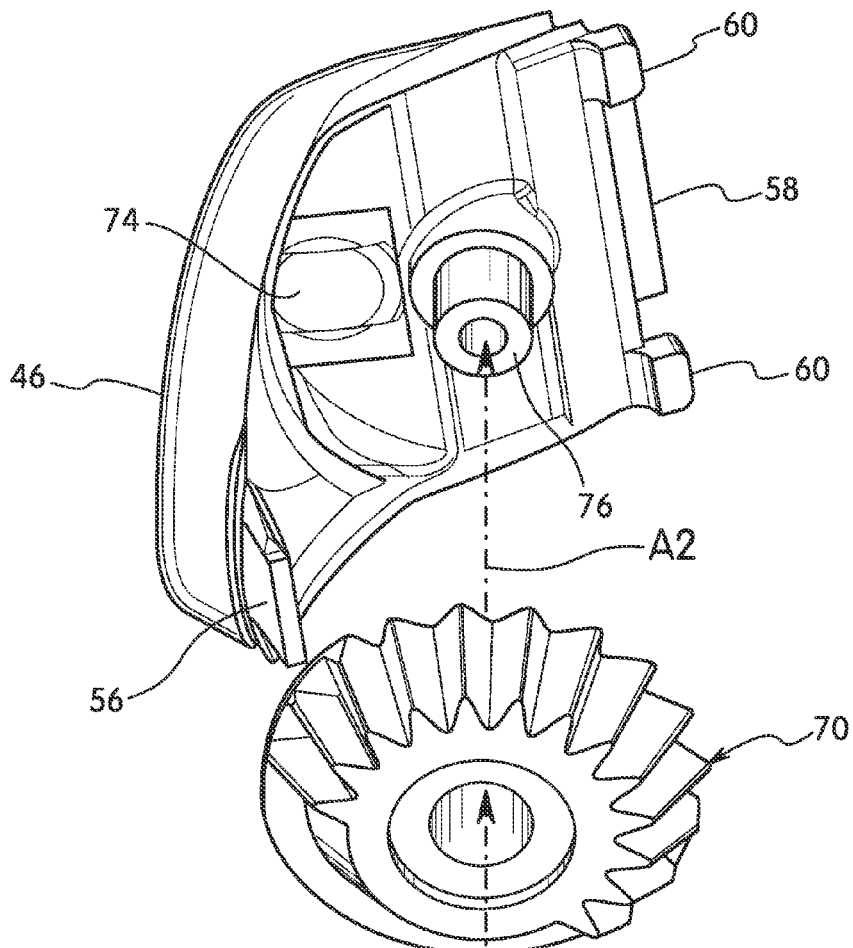
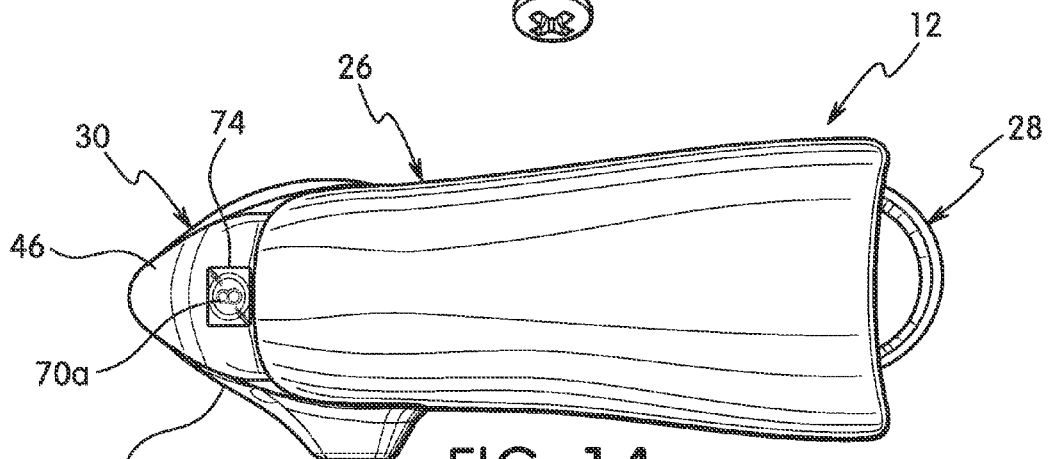

BICYCLE CONTROL DEVICE

BACKGROUND

1. Field of the Invention

This invention generally relates to a bicycle control device. More specifically, the present invention relates to a bicycle control device having an indicator with indicia indicative of a plurality of states of a bicycle component.

2. Background Information

Bicycles use bicycle control devices for controlling the operations of various bicycle components such as derailleurs, braking devices, suspension settings, seat post height settings, etc. Some of these bicycle control devices are provided with an indicator with indicia for indicating of a current state of a bicycle component. For example, in the case of a derailleur, a bicycle shift control device (i.e., a bicycle shifter) may include a gear indicator for providing a cyclist with an indication of the currently selected gear. Specifically, in the case of a derailleur, the gear indicator informs the cyclist of the engagement of the chain with one of the front chain rings or one of rear sprockets.

SUMMARY

One aspect presented in this disclosure is to provide a bicycle control device with indicia that indicates of a plurality of states of a bicycle so that the rider can easily recognize a current state of the bicycle.

In view of the state of the known technology, a bicycle control device is provided that basically comprises a support structure, a control unit, a first operating lever, a first gear and a second gear. The control unit is mounted on the support structure. The first operating lever is operatively connected to the control unit to operate the control unit. The first gear is rotatably mounted on the support structure about a first axis. The second gear is engaged with the first gear, and is rotatably mounted on the support structure about a second axis. The second gear includes indicia indicative of a plurality of states of a bicycle component.

These and other objects, features, aspects and advantages of the disclosed bicycle control device will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure:

FIG. 13 is a partially exploded bottom perspective view of selected parts of the bicycle control device illustrated in FIGS. 2 to 6; and FIG. 14 is a top plan view of the right hand side bicycle control device illustrated in FIGS. 2 to 6, showing indicium of the second gear through the magnifying lens such that the indicium of the second gear is visible from an exterior of the support structure of the right hand side bicycle control device.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
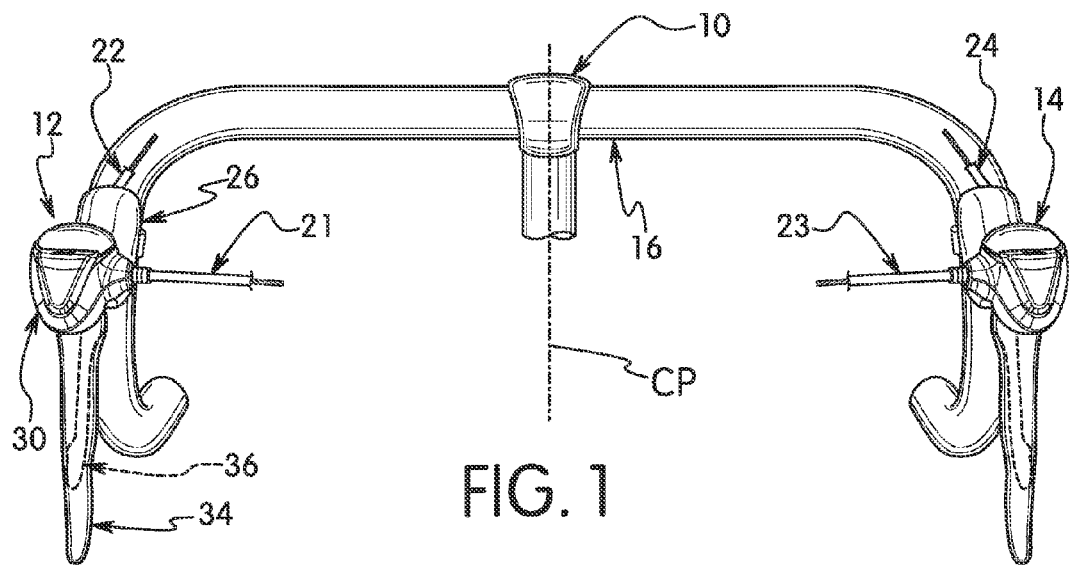
FIG. 1 is a front elevational view of a portion of a bicycle equipped with a pair of bicycle control devices coupled to a drop type handlebar in accordance with one illustrative embodiment.

Referring initially to FIG. 1, a portion of a bicycle 10 is illustrated that is equipped with a pair of bicycle control devices 12 and 14 in accordance with one illustrative embodiment. The bicycle control devices 12 and 14 are mounted on a drop down handlebar 16 as seen in FIG. 1. The bicycle control device 12 is a right hand shifter (bicycle shift operating device) that is operated by a rider's right hand to operate a first brake device (not shown) and a first gear shifting device (not shown, e.g., a cable operated rear derailleur). The bicycle control device 14 is a left hand shifter (bicycle shift operating device) that is operated by a rider's left hand to operate a second brake device (not shown) and a second gear shifting device (not shown, e.g., a cable operated front derailleur). The bicycle control devices 12 and 14 are parts of a conventional bicycle drive train. For example, in a bicycle drive train using a pair of derailleurs, the bicycle control devices 12 and 14 are used to operate the derailleurs to shift a bicycle chain for changing speeds of the drive train in a relatively conventional manner. In the illustrated embodiment, the bicycle control device 12 is operatively coupled to a first gear shifting device (e.g., a rear derailleur) via a shift control cable 21 and to a first brake device via a brake control cable 22. The bicycle control device 14 is operatively coupled to a second gear shifting device (e.g., a front derailleur) via a shift control cable 23 and to the second brake device via a brake control cable 24.

Figure 2:
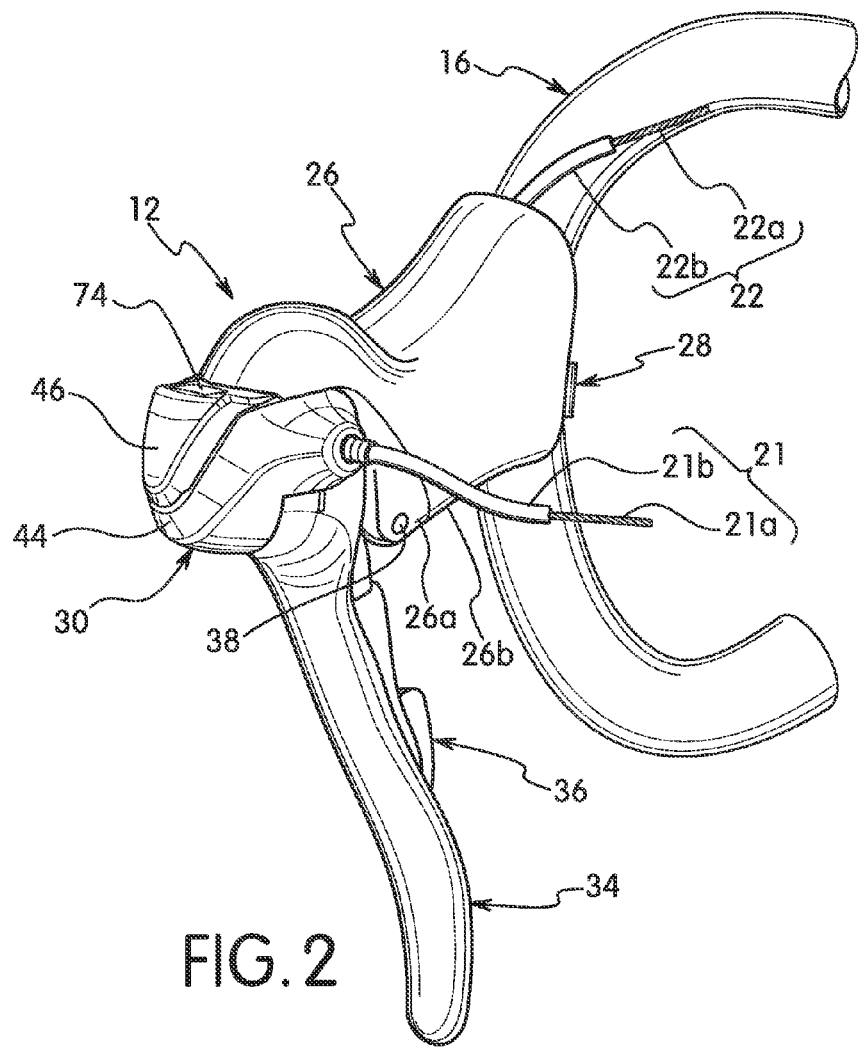
FIG. 2 is a front perspective view of the right hand side of the drop type handlebar and the right hand side bicycle control device illustrated in FIG. 1.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIG. 2, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle control device 12 to the first gear shifting device for shifting the first gear shifting device in response to operation of the bicycle control device 12.

In the illustrated embodiment, the bicycle control devices 12 and 14 are essentially identical in operation, except that they are mirror images of each other and they may have a different number of shift operations. In other words, the bicycle control device 14 is substantially identical to the bicycle control device 12, except for the bicycle control device 14 has been modified to be a mirror image and to decrease the number of gears that can be shifted with respect to the bicycle control device 12. Thus, only the bicycle control device 12 will be discussed and illustrated herein.

Figure 3:
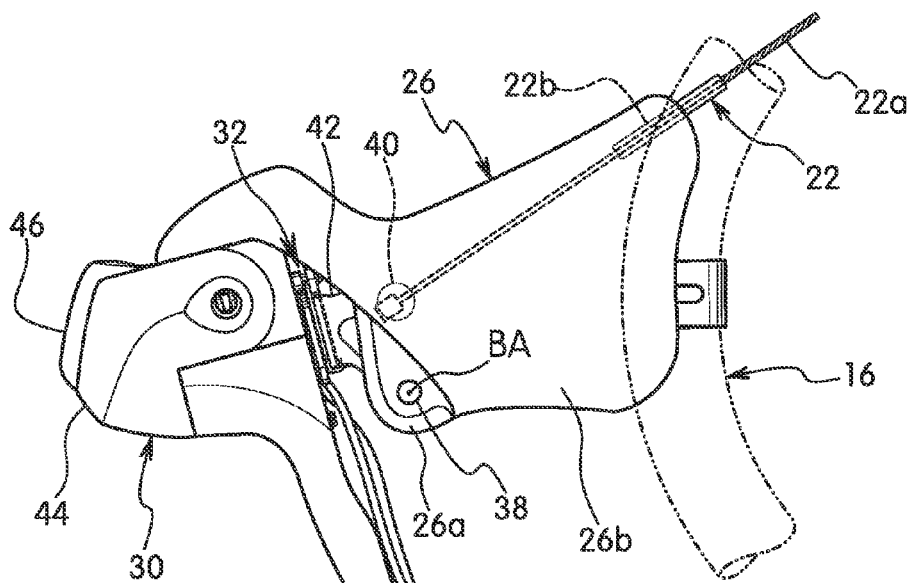
FIG. 3 is an inside elevational view of the bicycle control device illustrated in FIG. 2 with the first and second operating levers in their rest positions.
Figure 4:
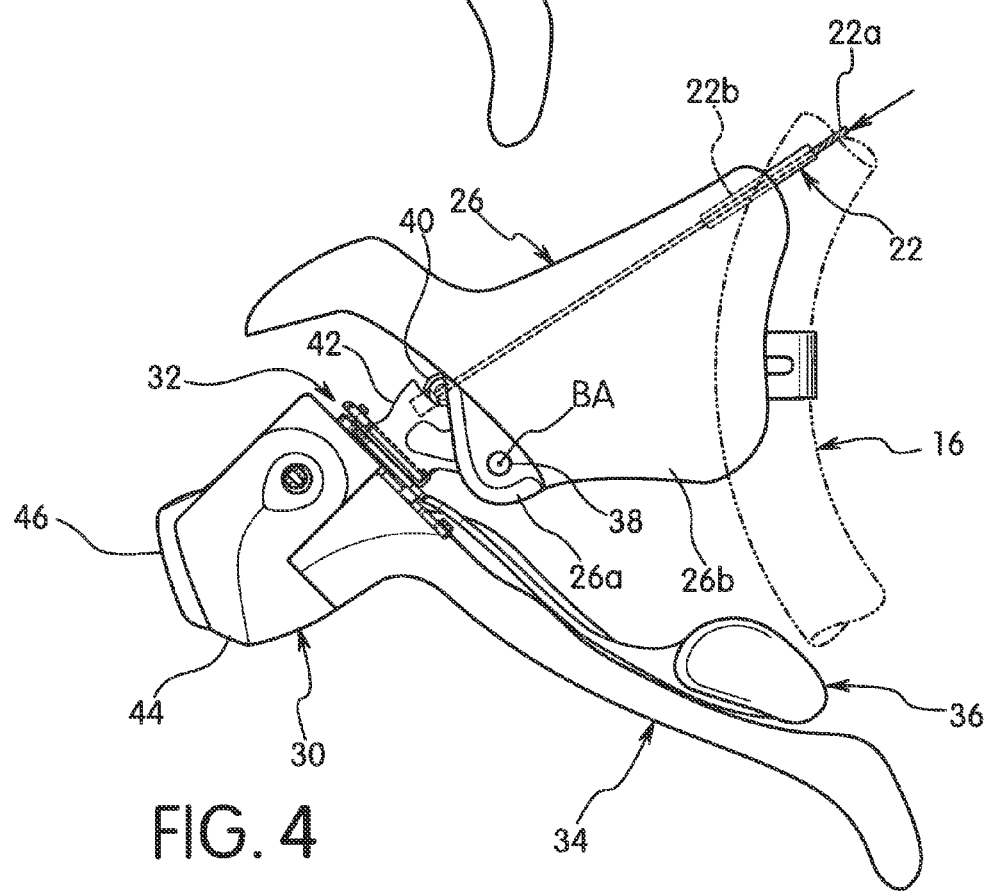
FIG. 4 is an inside elevational view of the bicycle control device illustrated in FIGS. 2 and 3, but with the first operating lever pivoted to a braking position which causes the second operating lever to be moved with the first operating lever about the braking pivot axis.

As seen in FIGS. 2 to 4, the bicycle control device 12 includes a bracket or base member 26 that is fixedly mounted to one of the curved portions of the drop down handlebar 16 by a handlebar mounting structure 28 (e.g. a conventional band clamp as shown). Since the base member 26 is fixed to the drop down handlebar 16 by the handlebar mounting structure 28, the base member 26 constitutes a fixed member. Riders sometimes grip the base member 26 and lean on the base member 26 during riding. It is desirable to provide a comfortable feeling for the rider's hand while the rider is gripping the base member 26. Thus, as seen in FIG. 2, the base member 26 has a rigid main body 26a and a soft outer elastomeric grip cover 26b. The grip cover 26b partially covers the main body 26a as seen in FIG. 2. In particular, the grip cover 26b is stretched over a gripping portion of the main body 26a. Typically, the main body 26a is made of a rigid plastic material. The base member 26 is a stationary member when mounted to the handlebar 16. The handlebar mounting structure 28 is preferably a conventional band clamp or similar structure that is used in a road shifter for mounting to a drop down style handlebar such as the drop down handlebar 16. Thus, the base member 26 and the handlebar mounting structure 28 are conventional structures, and thus, they will not be discussed in detail herein.

Figure 5:
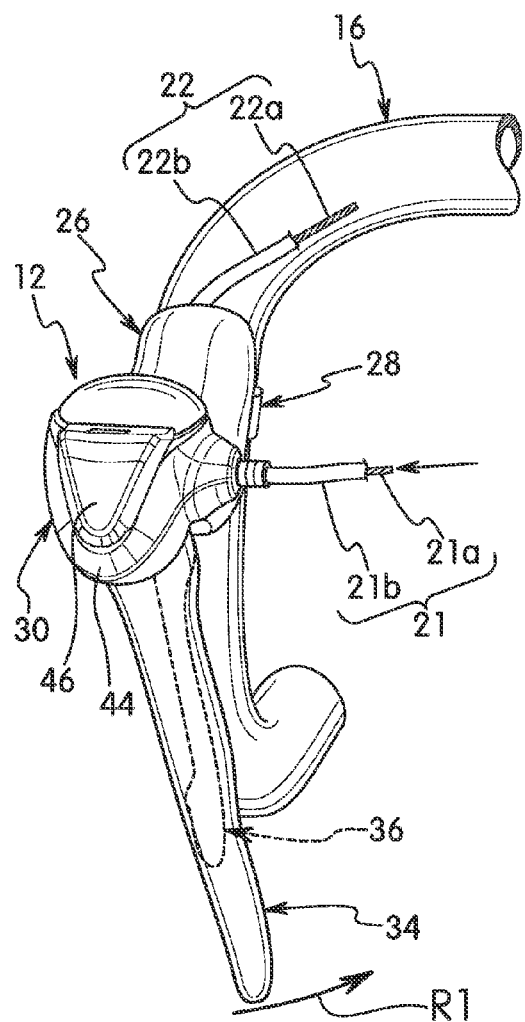
FIG. 5 is a front elevational view of the right hand side of the drop type handlebar with the right hand side bicycle control device illustrated in FIG. 1, but with the first operating lever moved from the rest position of FIG. 1 to an operated position which caused the second operating lever to be moved with the first operating lever.
Figure 6:
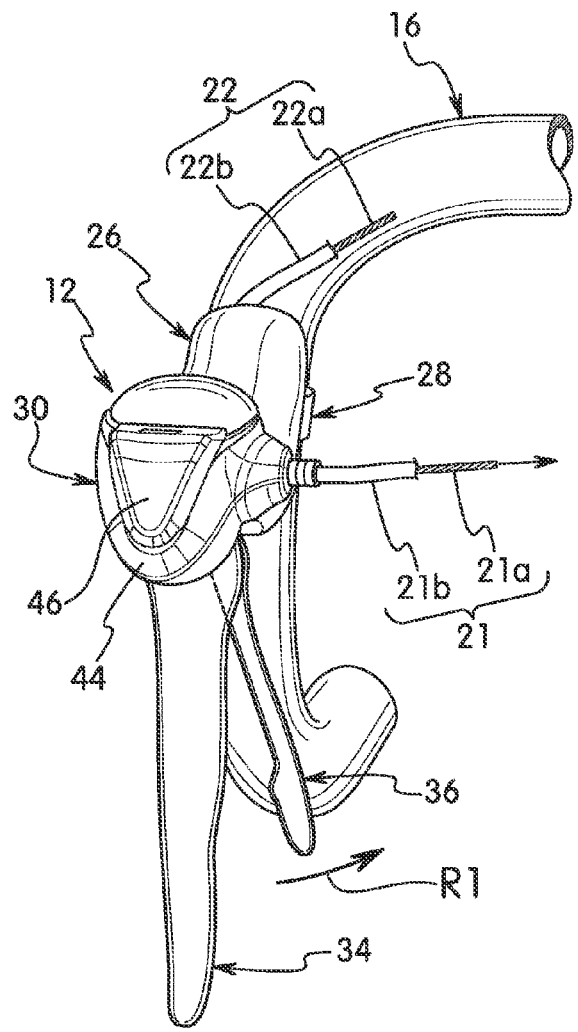
FIG. 6 is a front elevational view of the right hand side of the drop type handlebar with the bicycle control device illustrated in FIG. 1, but with the second operating lever moved from the rest position of FIG. 1 to an operated position and the first operating lever remaining stationary.

In this illustrative embodiment, as seen in FIGS. 3 to 6, the bicycle control device 12 further includes a support structure 30 and a shift control unit 32. In this illustrated embodiment, the shift control unit 32 is provided with a first operating lever 34 and a second operating lever 36 for operating the shift control unit 32 to pull and release the inner wire 21a of the shift control cable 21. In this illustrated embodiment, the first operating lever 34 is used to perform both a braking operation (FIG. 4) and a shifting operation (FIG. 5), while the second operating lever 36 only performs a shifting operation (FIG. 6). Thus, the bicycle control device 12 is sometimes called a road "brifter".

As explained later, the first operating lever 34 and the second operating lever 36 are operatively coupled to the shift control unit 32 for performing shifting operations in a gear shifting device to change gears (i.e., shifting a chain between the gears). Also as explained later, the first operating lever 34 and the second operating lever 36 are preferably both pivoted relative to the main body 26a of the base member 26 in a direction R1 towards a bicycle longitudinal center plane CP for performing shifting operations.

In this illustrative embodiment, the shift control unit 32 is mounted on the support structure 30 such that the support structure 30 and the shift control unit 32 are an integrated unit that is attached to the main body 26a of the base member 26. In particular, as seen in FIGS. 3 and 4, the support structure 30 is pivotally mounted on the base member 26 by a pivot pin 38 such that the support structure 30 and the shift control unit 32 pivot relative to the base member 26 about a braking pivot axis BA. The support structure 30 includes a brake cable attachment structure 40 for attaching the inner wire 22a of the brake control cable 22. In particular, the inner wire 22a of the brake control cable 22 passes through a bore of the main body 26a of the base member 26 and attached to the brake cable attachment structure 40 of the support structure 30. The outer case 22b of the brake control cable 22 contacts the main body 26a of the base member 26 such that the inner wire 22a of the brake control cable 22 slides within the outer case 22b as the first operating lever 34 is pivoted on the pivot pin 38 about the braking pivot axis BA to perform a braking operation.

Figure 7:
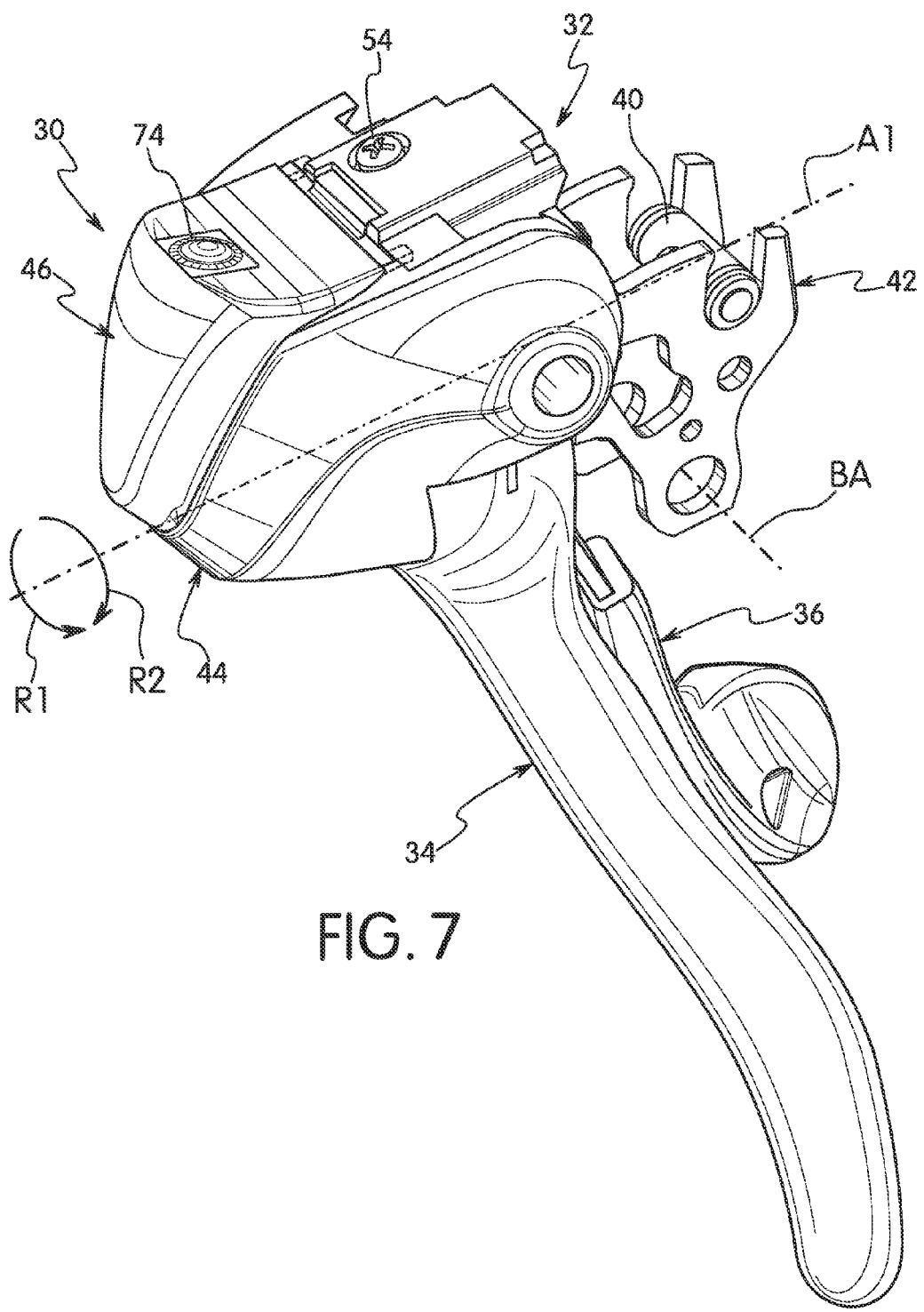
FIG. 7 is a front perspective view of selected parts of the bicycle control device illustrated in FIGS. 2 to 6.
Figure 8:
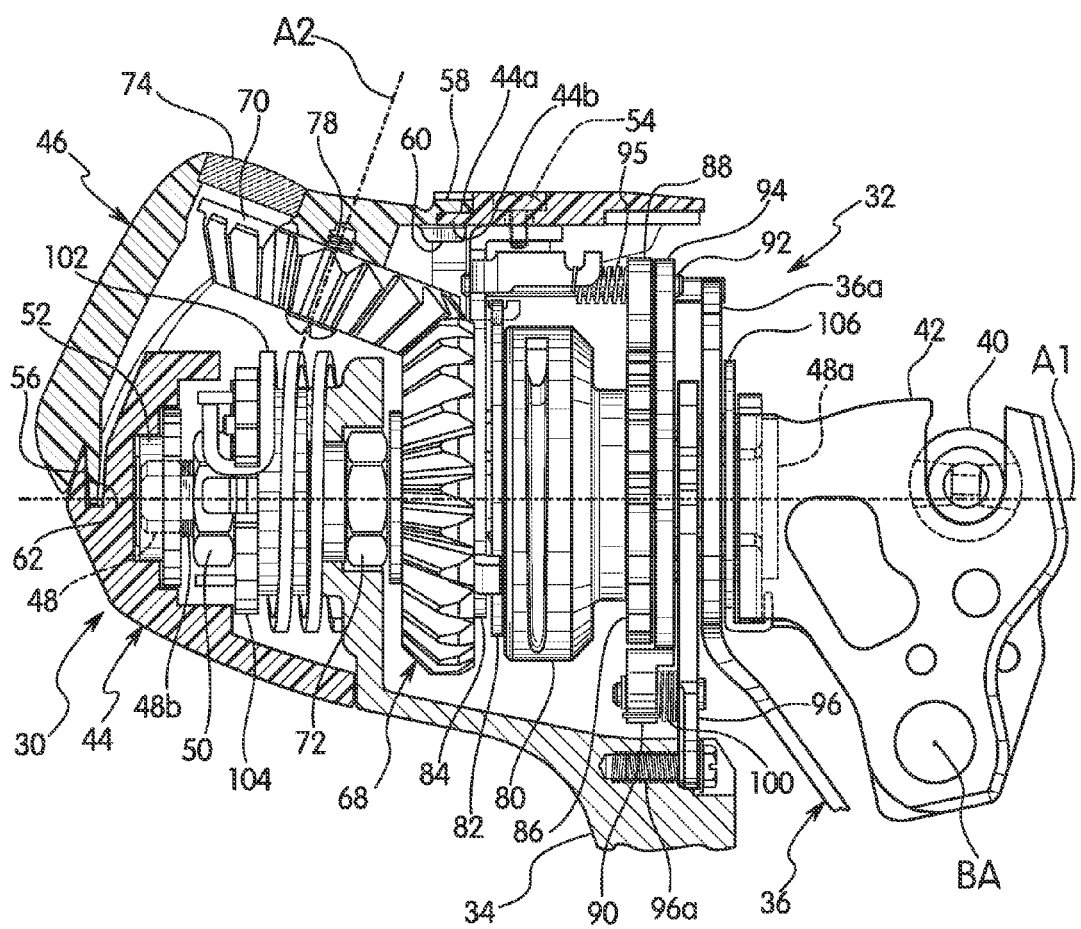
FIG. 8 is a cross sectional view of selected parts of the bicycle control device illustrated in FIGS. 2 to 6 taken along a vertical center plane of the bicycle control device.

Referring to FIGS. 7 and 8, the support structure 30 basically includes a main support 42, a housing member 44, a cover member 46 and a mounting axle 48. The support structure 30 also includes other parts located on the mounting axle 48 as discussed below. The main support 42 is pivotally mounted on the main body 26a of the base member 26 by the pivot pin 38 such that the support structure 30 and the shift control unit 32 pivot relative to the base member 26 about the braking pivot axis BA as seen in FIG. 4. The shift control unit 32 is mounted on the mounting axle 48 of the support structure 30.

Figure 9:
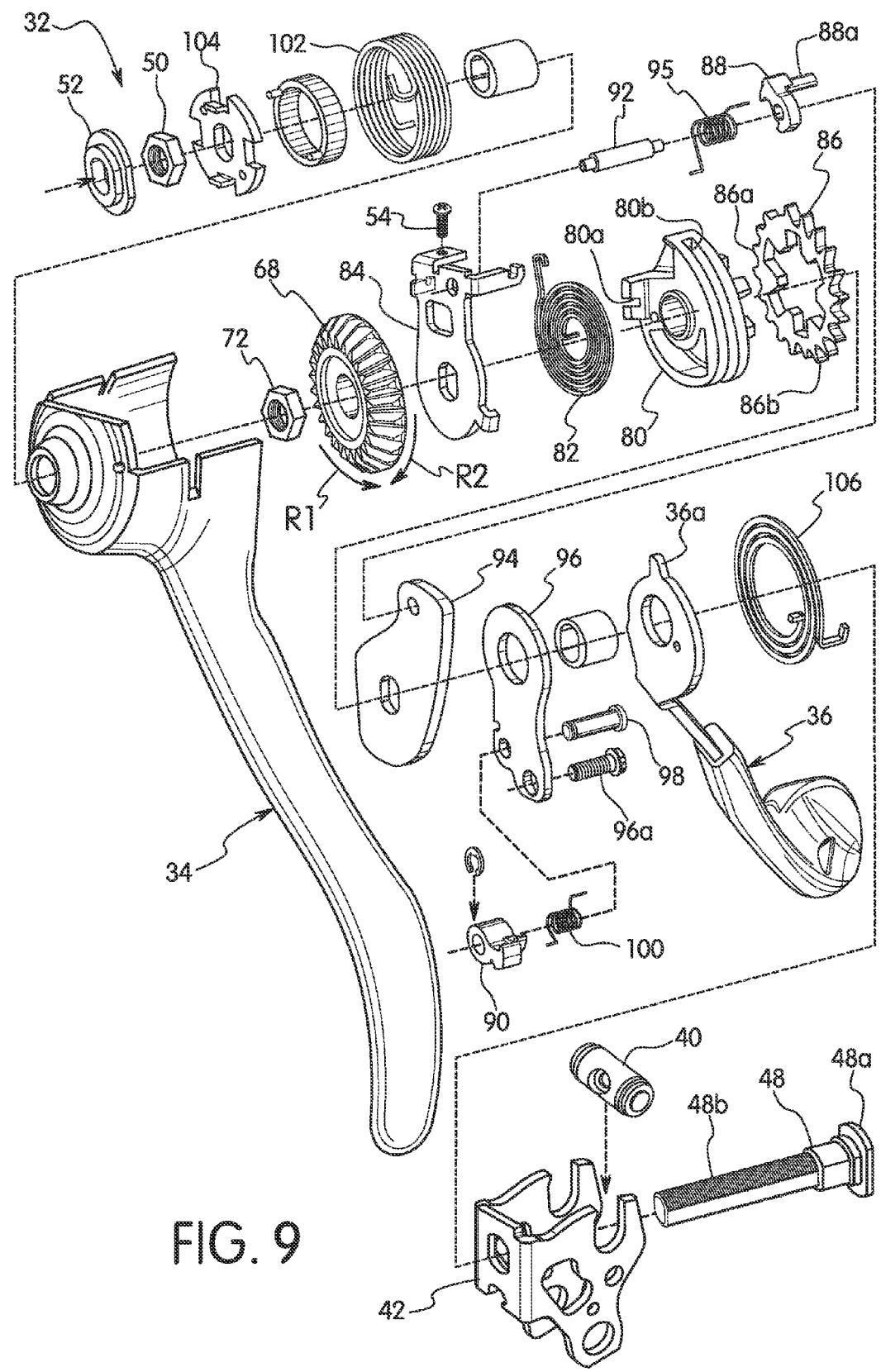
FIG. 9 is a partially exploded perspective view of selected parts of the bicycle control device illustrated in FIGS. 2 to 6.

As seen in FIG. 9, basically, the mounting axle 48 is a bolt that has a head 48a and a non-circular shaft 48b with a threaded section. The threaded shaft 48b passes through a non-circular opening of the main support 42 and through the shift control unit 32. Thus, the main support 42 is non-rotatably supported on the mounting axle 48. A nut 50 is screwed onto the threaded section of the shaft 48b to secure the shift control unit 32, the first operating lever 34, the second operating lever 36 and the main support 42 on the shaft 48b are arranged between the head 48a and the nut 50.

As seen in FIG. 8, the housing member 44 is also non-rotatably mounted to the mounting axle 48 by mating with a cap 52 of the support structure 30, which is non-rotatably disposed on the end of the shaft 48b, and a fastener 54 (e.g., a screw as shown). Basically, the housing member 44 covers a portion of the shift control unit 32. The housing member 44 is preferably a one-piece, unitary member that is made of a suitable rigid material such as a hard plastic material.

Figure 10:
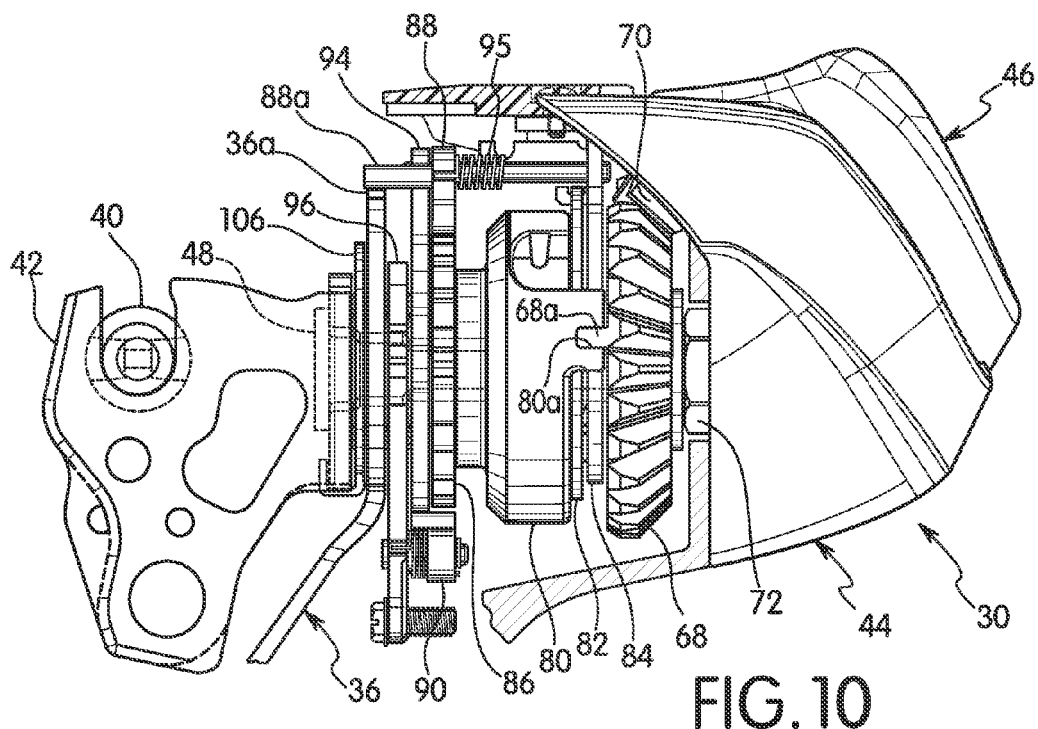
FIG. 10 is an outside elevational view of selected parts of the bicycle control device illustrated in FIGS. 2 to 6.
Figure 11:
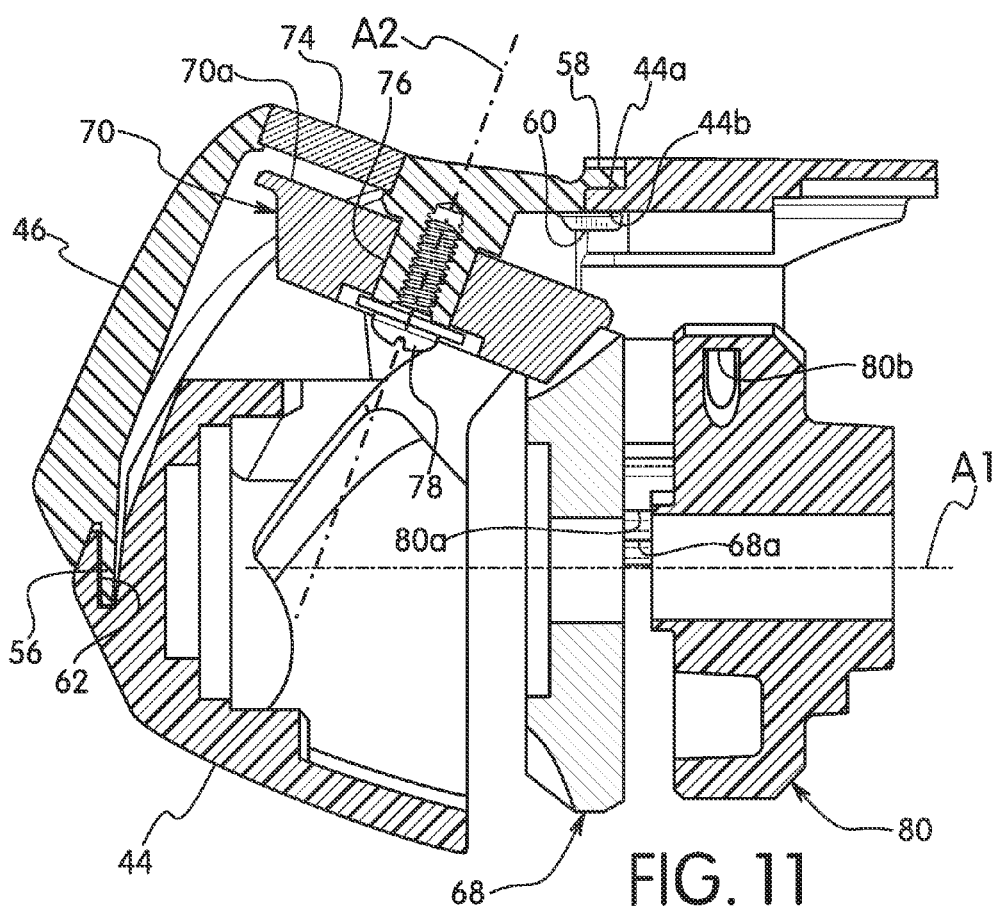
FIG. 11 is another cross sectional view of selected parts of the bicycle control device illustrated in FIGS. 2 to 6 taken along a vertical center plane of the bicycle control device.
Figure 12:
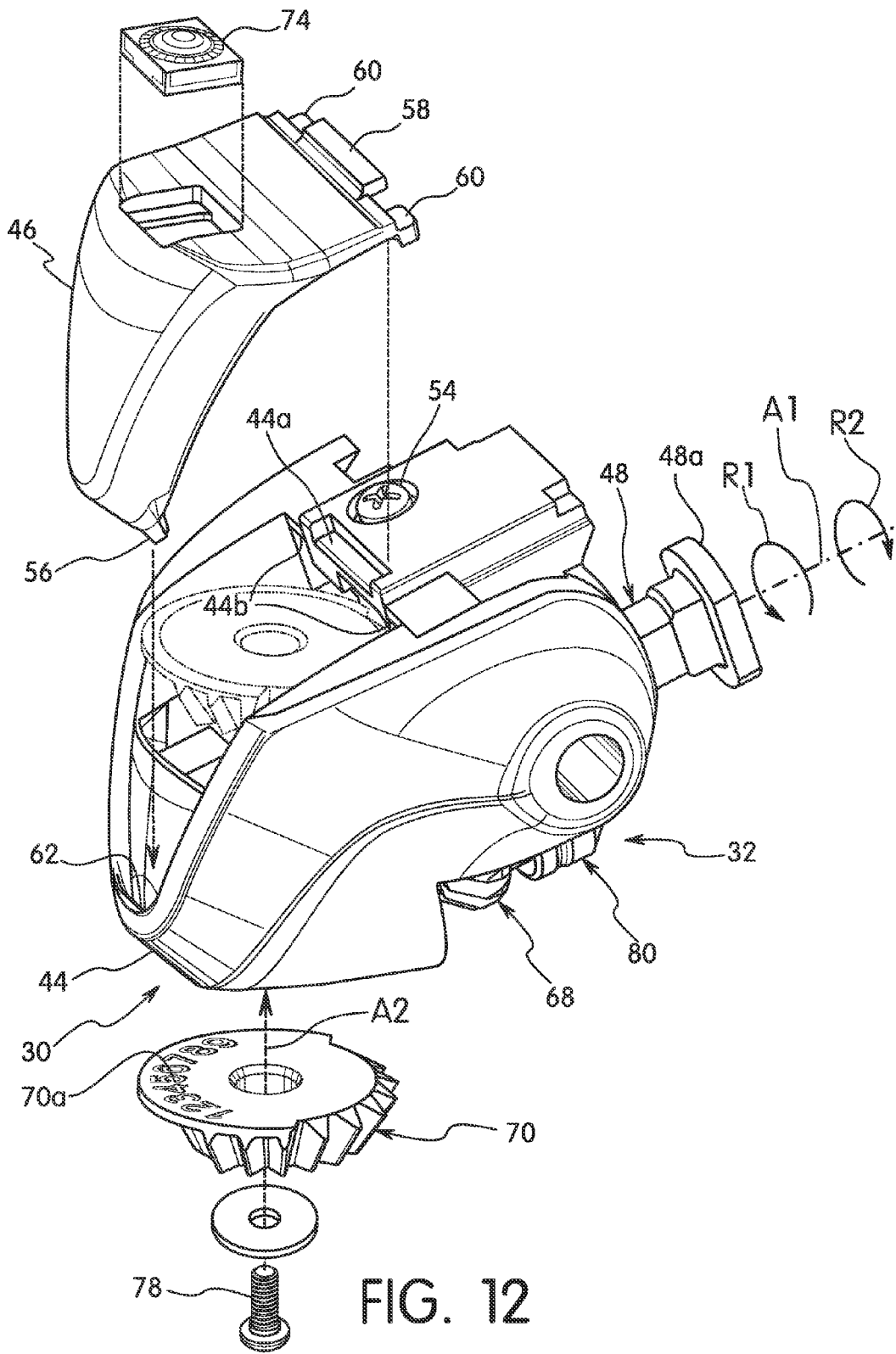
FIG. 12 is a partially exploded front perspective view of selected parts of the bicycle control device illustrated in FIGS. 2 to 6.

As seen in FIGS. 10 to 12, the cover member 46 is removably attached to the housing member 44 without any fasteners. In particular, as seen in FIG. 12 the cover member 46 has a tab or projection 56, a tab or projection 58 and a pair of tabs or projections 60. The projection 56 fits into a slot or recess 62 of the housing member 44, while the projection 58 engages an exterior surface 44a of the housing member 44 and the projections 60 engage an interior surface 44b of the housing member 44. The cover member 46 is preferably a one-piece, unitary member that is made of a suitable rigid material such as a hard plastic material.

As seen in FIGS. 10 to 13, the bicycle control device 12 further includes a bicycle speed indicating mechanism that basically includes a first gear 68 and a second gear 70. The first gear 68 and the second gear 70 are bevel gears. The second gear 70 includes teeth that are engaged with teeth of the first gear 68. The first gear 68 is rotatably mounted on the support structure 30 about a first axis A1. The first gear 68 is secured to the mounting axle 48 by a nut 72. The mounting axle 48 defines the first axis A1 and rotatably supports the first gear 68. The second gear 70 is engaged with the first gear 68, and is rotatably mounted on the support structure 30 about a second axis A2 that is nonparallel to the first axis A1. The first axis A1 of the first gear 68 and the second axis A2 of the second gear 70 are non-perpendicularly arranged. The first axis A1 of the first gear 68 and the second axis A2 of the second gear 70 are also nonparallel axes. The second gear 70 includes indicia 70a indicative of a plurality of states of a bicycle component (e.g., a bicycle derailleur as shown). In particular, in the illustrated embodiment, the indicia 70a of the second gear 70 includes a plurality of consecutive numbers "1", "2", "3", "4", "5", "6", "7", "8" and "9" indicative of a plurality of gear positions of a nine speed bicycle derailleur. Thus, the second gear 70 constitutes a speed indicator gear.

As seen in FIGS. 11 to 14, in the illustrated embodiment, the cover member 46 of the support structure 30 has an opening with a magnifying lens 74 through which the indicia 70a of the second gear 70 are selectively visible from an exterior of the support structure 30. The cover member 46 has a mounting shaft 76 defining the second axis A2 and rotatably supporting the second gear 70. The second gear 70 is rotatably secured on the mounting shaft 76 by a screw 78 that is screwed into a threaded hole in the mounting shaft 76.

Referring to FIGS. 8, 9 and 10, the shift control unit 32 will now be discussed. Since the shift control unit 32 is a conventional shift control unit, the shift control unit 32 will only be briefly discussed as needed to understand the interaction with the bicycle speed indicating mechanism (the first and second gears 68 and 70). As mentioned above, the first and second operating levers 34 and 36 are operatively connected to the shift control unit 32 to operate the shift control unit 32. In the illustrated embodiment, the first and second operating levers 34 and 36 are pivotally mounted on the mounting axle 48 of the support structure 30 between the main support 42 and the nut 50. The first and second operating levers 34 and 36 are pivoted in direction R1 towards the bicycle longitudinal (vertical) center plane CP (FIG. 1) of the bicycle to operate the shift control unit 32.

The shift control unit 32 includes a winding member or spool 80 that is rotatably mounted on the mounting axle 48 to rotate relative to the support structure 30. The first gear 68 is coupled to the winding member 80 such that the first gear 68 rotates with the winding member 80 as an integrated unit. In particular, as seen in FIGS. 9 and 10, the first gear 68 has a projection 68a that is engaged in a recess or notch 80a of the winding member 80 so that the first gear 68 and the winding member 80 rotate together on the mounting axle 48 about the first axis A1. Thus, the first axis A1 also corresponds to a main rotational axis of the winding member 80.

The winding member 80 has a conventional wire attachment structure 80b that includes an opening for receiving the inner wire 21a and engaging an end nipple or barrel that is secured to one end of the inner wire 21a. The winding member 80 is used to pull the inner wire 21a relative to the support structure 30 in response to operation of the first operating lever 34, and release the inner wire 21a relative to the support structure 30 in response to operation of the second operating lever 36.

The winding member 80 rotates in a first direction R1 in response to movement of the first operating lever 34 from a rest position (FIG. 1) to an operated position (FIG. 5). The winding member 80 rotates in a second direction R2, which is opposite to the first direction R1, in response to movement of the second operating lever 36 from a rest position (FIG. 1) to an operated position (FIG. 6). Thus, the winding member 80 is also known as a wire take-up member or a cable spool.

A biasing member 82 is provided between the winding member 80 and a first stationary mounting plate 84 on the mounting axle 48 of the support structure 30 to bias the winding member 80 in the second direction R2 about the first axis A1. In the illustrated embodiment, the biasing element 82 is a torsion spring having its coiled portion disposed on the mounting axle 48 with its first free end disposed in a hole in the winding member 80 and its second free end hooked onto the first stationary mounting plate 84 of the support structure 30. The threaded shaft 48b passes through a non-circular opening of the first stationary mounting plate 84 so that the first stationary mounting plate 84 is non-rotatably supported on the mounting axle 48.

To rotate and maintain the position of the winding member 80 relative to the support structure 30, the shift control unit 32 further includes a positioning ratchet 86, a positioning pawl 88 and a winding or pulling pawl 90, The positioning ratchet 86, the positioning pawl 88 and the pulling pawl 90 of the shift control unit 32 constitutes a gear positioning mechanism that selectively maintains the winding member 80 in any one of a plurality of different gear positions (e.g., nine gear positions in the illustrated embodiment). It will be apparent from this disclosure that the bicycle speed indicating mechanism (the first and second gears 68 and 70) can be used with other types of shift control units. For example, the shift control unit 32 can be replaced with a shift control unit that is operated with a single operating lever. Moreover, while the shift control unit 32 is configured to perform only single shift per single continuous progressive movement of each of the first and second operating levers 34 and 36, the shift control unit 32 can be replaced with a shift control unit that can perform multiple shifts with a single continuous progressive movement of each of the first and second operating levers 34 and 36.

The positioning ratchet 86 is fixedly coupled to the winding member 80 so that the winding member 80 and the positioning ratchet 86 rotate together on the mounting axle 48 about the first axis A1. The positioning ratchet 86 includes a plurality of winding teeth 86a and a plurality of positioning teeth 86b. The pulling pawl 90 engages the winding teeth 86a to rotate the positioning ratchet 86 in the first direction R1 as the first operating lever 34 pivots from the rest position (FIG. 1) to the operated position (FIG. 2). As the first operating lever 34 moves from the rest position to the operated position, the second operating lever 36 will move with the first operating lever 34 since an abutment of the first operating lever 34 contacts the second operating lever 36 to pivot the second operating lever 36 from its rest position. This movement of the second operating lever 36 will pivot the positioning pawl 88 with respect to the positioning teeth 86b such that the positioning ratchet 86 can be rotated one gear position by the pulling pawl 90 engaging the winding teeth 86a and rotating the positioning ratchet 86.

The positioning pawl 88 is pivotally mounted on a pin 92 that is supported on the mounting axle 48 by the first stationary mounting plate 84 and a second stationary mounting plate 94 of the support structure 30. The threaded shaft 48b passes through a non-circular opening of the second stationary mounting plate 94 so that the second stationary mounting plate 94 is non-rotatably supported on the mounting axle 48. A biasing member 95 is provide on the pin 92 to bias the positioning pawl 88 toward engagement with the positioning teeth 86b of the positioning ratchet 86 to prevent positioning ratchet 86 from rotating in the second direction R2. As mentioned above, the biasing member 82 biases the winding member 80 in the second direction R2.

The pulling pawl 90 is mounted to the first operating lever 34 by an attachment plate 96. The pulling pawl 90 is pivotally mounted to the attachment plate 96 by a pin 98. The attachment plate 96 is fixed to the first operating lever 34 by a screw 96a. In this way, the pulling pawl 90 pivots relative to the first operating lever 34 as the first operating lever 34 moves from the rest position to the operated position. A biasing member 100 is provide on the pin 98 to bias the pulling pawl 90 toward engagement with the positioning teeth 86b of the positioning ratchet 86. However, while the first operating lever 34 is in the rest position, tip of the pulling pawl 90 is held out of engagement with the positioning teeth 86b of the positioning ratchet 86 by the second stationary mounting plate 94.

The second operating lever 36 is provided with a projection 36a for moving the positioning pawl 88 out of engagement with the positioning teeth 86b of the positioning ratchet 86 as the second operating lever 36 pivots from the rest position (FIG. 1) to the operated position (FIG. 6). In particular, the projection 36a has a camming surface that engages an extension 88a on the positioning pawl 88 to pivot the positioning pawl 88 as the second operating lever 36 pivots from the rest position to the operated position. This pivoting of the positioning pawl 88 by the projection 36a lifts a positioning tooth of the positioning pawl 88 out of engagement with the positioning teeth 86b of the positioning ratchet 86 and moves a stop tooth into engagement with the positioning teeth 86b of the positioning ratchet 86 such that the positioning ratchet 86 rotates one gear position in in the second direction R2 due to the biasing force of the biasing member 82.

In the illustrative embodiment, the first and second operating levers 34 and 36 are trigger type levers that are biased to the rest positions in a conventional manner. In particular, a first return spring or biasing member 102 is provided between the first operating lever 34 and a third stationary mounting plate 104 on the mounting axle 48 of the support structure 30 to bias the first operating lever 34 to its rest position. A second return spring or biasing member 106 is provided between the second operating lever 36 and the main support 42 on the mounting axle 48 of the support structure 30 to bias the second operating lever 36 to its rest position. In the illustrated embodiment, the biasing member 102 is a torsion spring having its coiled portion disposed on the mounting axle 48 with its first free end contacting the first operating lever 34 and its second free end contacting the third stationary mounting plate 104 of the support structure 30. Similarly, the biasing member 106 is a torsion spring having its coiled portion disposed on the mounting axle 48 with its first free end contacting the second operating lever 36 and its second free end contacting the main support 42 of the support structure 30.

Since the shift control unit 32 is a relatively conventional shift control unit that is similar to shift control units used in Shimano road shifters, the shift control unit 32 will not be discussed in further detail.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the term "rest position" as used herein refers to a state in which the part (e.g., the first and second operating levers 34 and 36) remains stationary without the need of a user holding the part in that state corresponding to the rest position. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle control device. Accordingly, these terms, as utilized to describe the bicycle control device should be interpreted relative to a bicycle equipped with the bicycle control device as used in the normal riding position on a flat level surface. Finally, terms of degree such as "substantially", "about" and "approximately" as used herein mean an amount of deviation of the modified term such that the end result is not significantly changed such as to accommodate manufacturing tolerances.

Although the illustrative embodiment presents a road style shifter as an example of a bicycle control device, the bicycle control device is not limited to a road style shifter. For example, it is acceptable if the bicycle control device is a mountain bicycle shifter, a suspension control device, a seat post height control device, or other types of bicycle control devices.

Thus, while only one selected embodiment has been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
    a support structure;
    a control unit mounted on the support structure around a first axis;
    a first operating lever operatively connected to the control unit to operate the control unit, and having a first proximal end and a second free end;
    a first gear rotatably mounted on the support structure about the first axis; and
    a second gear engaged with the first gear and rotatably mounted on the support structure about a second axis, the second axis being nonparallel and non-perpendicularly arranged relative to the first axis, the second gear including indicia indicative of a plurality of states of a bicycle component,
    the first operating lever being configured to notate around the first axis adjacent the first proximal end to operate the control unit.

2. The bicycle control device according to claim 1, wherein the support structure includes a housing member and a cover member removably attached to the housing member, the cover member has a mounting shaft defining the second axis and rotatably supporting the second gear.

3. The bicycle control device according claim 2, wherein the cover member has a magnifying lens through which the indicia of the second gear is visible from an exterior of the support structure.

4. The bicycle control device according to claim 1 wherein the support structure has a magnifying lens through which the indicia of the second gear is visible from an exterior of the support structure.

5. The bicycle control device according to claim 1, wherein the control unit is mounted to the support structure by a mounting axle, the mounting axle defines the first axis and rotatably supports the first gear.

6. The bicycle control device according to claim 5, wherein the control unit includes a winding member rotatably mounted on the mounting axle relative to the support structure.

7. The bicycle control device according to claim 6, wherein the first gear rotates with the winding member as an integrated unit.

8. A bicycle control device comprising:
a support structure;
a control unit mounted on the support structure around a first axis;
a first operating lever operatively connected to the control unit to operate the control unit, and having a first proximal end and a second free end;
a first bevel gear rotatably mounted on the support structure about the first axis; and
a second bevel gears are engaged with the first bevel gear and rotatably mounted on the support structure about a second axis, the second bevel gear including indicia indicative of a plurality of states of a bicycle component,
the first operating lever being configured to rotate around the first axis adjacent the first proximal end to operate the control unit.

9. A bicycle control device comprising:
a support structure;
a control unit mounted on the support structure;
a first operating lever operatively connected to the control unit to operate the control unit;
a first gear rotatably mounted on the support structure about a first axis;
a second gear engaged with the first gear and rotatably mounted on the support structure about a second axis, the second gear including indicia indicative of a plurality of states of a bicycle component; and
a base member configured to be attached to a bicycle handlebar.
the support structure being pivotally mounted on the base member.

10. A bicycle control device comprising:
a support structure;
a control unit mounted on the support structure around a first axis;
a first operating lever operatively connected to the control unit to operate the control unit, and having a first proximal end and a second free end;
a first gear rotatably mounted on the support structure about the first axis;
a second gear engaged with the first gear and rotatably mounted on the support structure about a second axis, the second gear including indicia indicative of a plurality of states of a bicycle component; and
a second operating lever operatively connected to the control unit to operate the control unit,
the first operating lever being configured to rotate around the first axis adjacent the first proximal end to operate the control unit.

11. The bicycle control device according to claim 10, wherein
the control unit includes a winding member rotatably mounted on a mounting axle relative to the support structure, the winding member rotates to a first direction in response to movement of the first operating lever, the winding member rotates in a second direction being opposite to the first direction in response to movement of the second operating lever.

* * * * *